US00RE36438E

United States Patent [19]

Honkawa

[11] E Patent Number: Re. 36,438

[45] Reissued Date of Patent: Dec. 14, 1999

[54] COMBINED FLORAL DISPLAY AND KEEPSAKE

[75] Inventor: Bryan K. Honkawa, Malibu, Calif.

[73] Assignee: Teleflora LLC, Los Angeles

[21] Appl. No.: 09/013,119

[22] Filed: Jan. 26, 1998

Related U.S. Patent Documents

Reissue of:

[64] Patent No.: 5,645,168
Issued: Jul. 8, 1997
Appl. No.: 08/390,688
Filed: Feb. 17, 1995

[51] Int. Cl.[6] ..... B65D 85/52; A47G 33/04

[52] U.S. Cl. ..... 206/423; 206/779; 428/7

[58] Field of Search ..... 206/423, 779, 206/216, 575; 428/7–9

[56] References Cited

U.S. PATENT DOCUMENTS

| | | | |
|---|---|---|---|
| 903,227 | 11/1908 | Pruden | 206/216 X |
| 1,468,743 | 9/1923 | Porter | 206/44 |
| 1,874,185 | 8/1932 | Goldstein . | |
| 3,123,207 | 3/1964 | Goldstein | 206/44 |
| 3,177,617 | 4/1965 | Koistinen | 206/423 X |
| 3,183,624 | 5/1965 | Swett | 206/423 X |
| 3,301,516 | 1/1967 | Bruno . | |
| 3,574,498 | 4/1971 | Zarinsky | 431/126 |
| 4,193,351 | 3/1980 | Belokin, Jr. | 206/44 |
| 4,248,347 | 2/1981 | Trimbee | 206/423 |
| 4,521,990 | 6/1985 | Murray | 47/41.12 |
| 4,601,130 | 7/1986 | Du Vall | 47/41.12 |
| 4,601,403 | 7/1986 | Pollitz | 215/228 |
| 4,621,733 | 11/1986 | Harris | 206/423 |
| 4,726,468 | 2/1988 | Hesser et al. | 206/423 |
| 4,917,240 | 4/1990 | Roberts et al. | 206/232 |
| 5,060,798 | 10/1991 | Braastad | 206/423 |
| 5,088,216 | 2/1992 | Wasilko | 206/423 X |
| 5,410,838 | 5/1995 | O'Leary et al. | 206/423 X |

*Primary Examiner*—Bryon P. Gehman
*Attorney, Agent, or Firm*—Pretty, Schroeder & Poplawski

[57] ABSTRACT

A combined floral display and keepsake are described. The floral display includes a container (1) with a bottom (4), side walls (7) and a pick (8) extending vertically upwards from the container bottom. Flowers (13) are displayed by positioning them into a foam block (14) contained in the container. The keepsake (2) is elevated above the container, connected to the top of the pick by an attachment mechanism (3). When the floral arrangement is no longer fresh, the container, the pick, the foam block, and the flowers may be discarded, while the keepsake remains useful and decorative.

15 Claims, 4 Drawing Sheets

FIG. 2
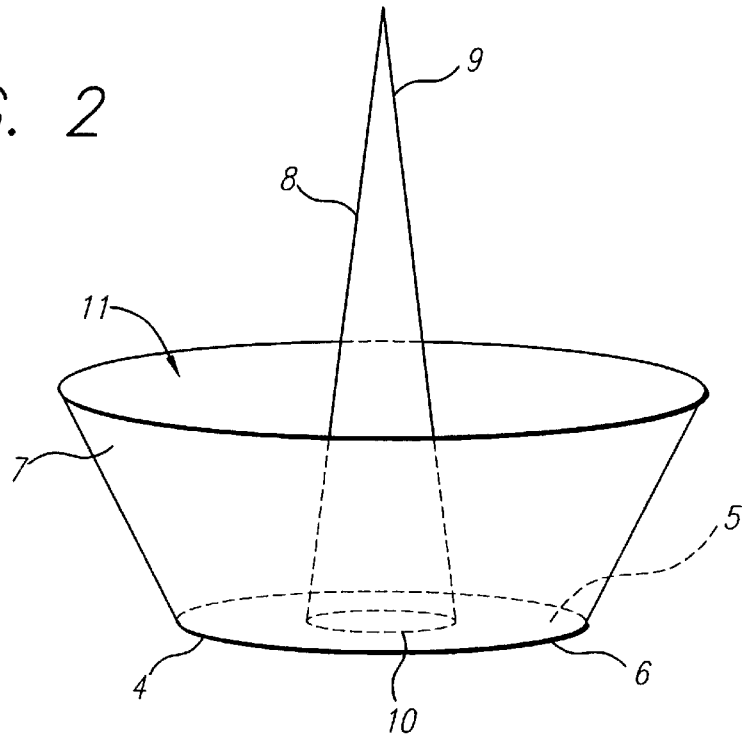
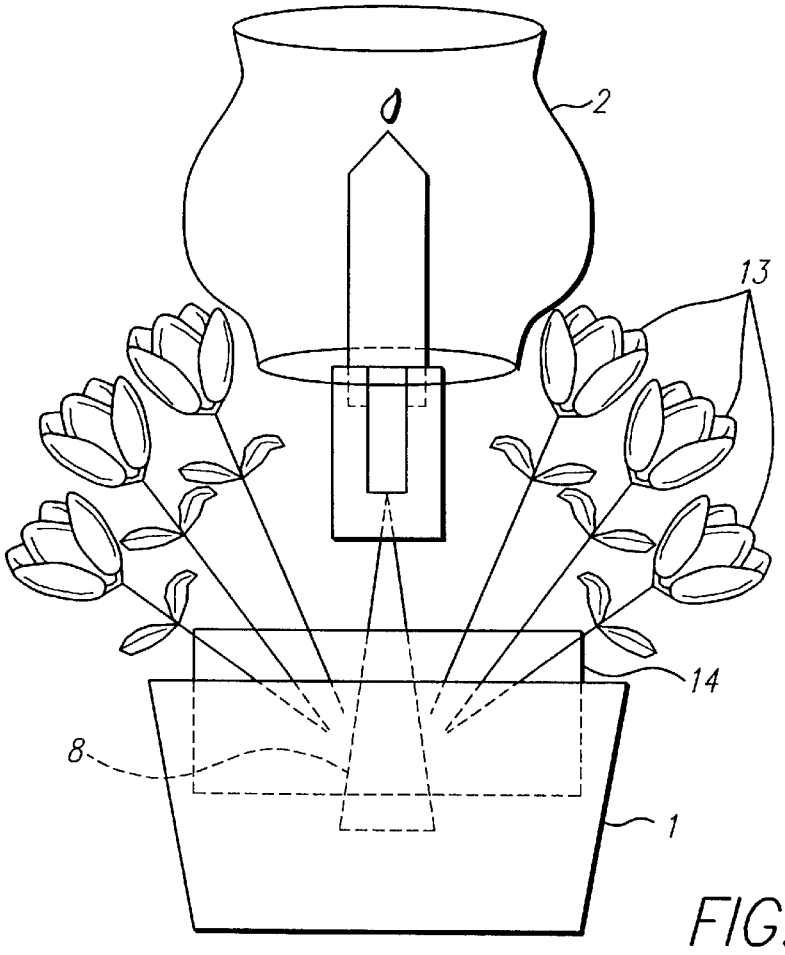
FIG. 3

FIG. 6
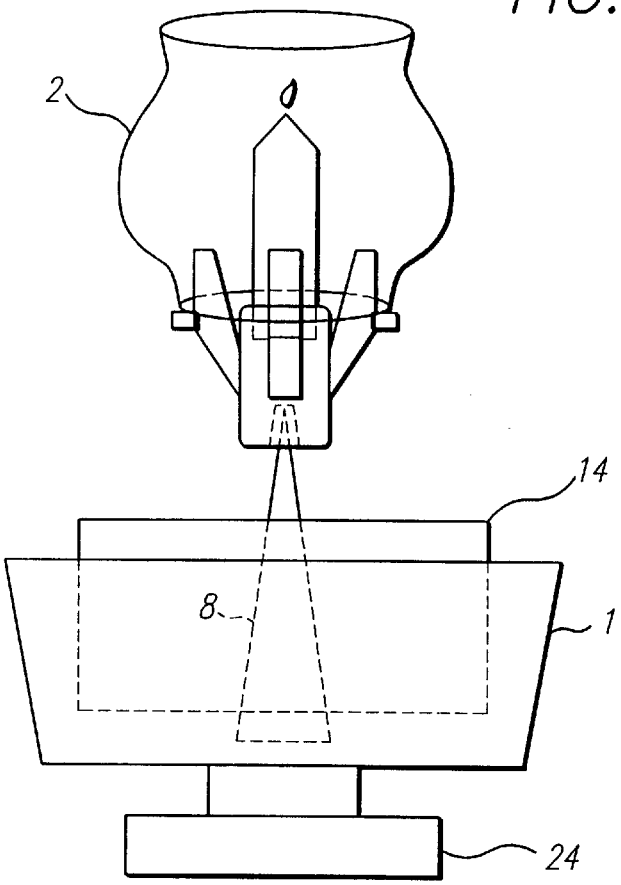
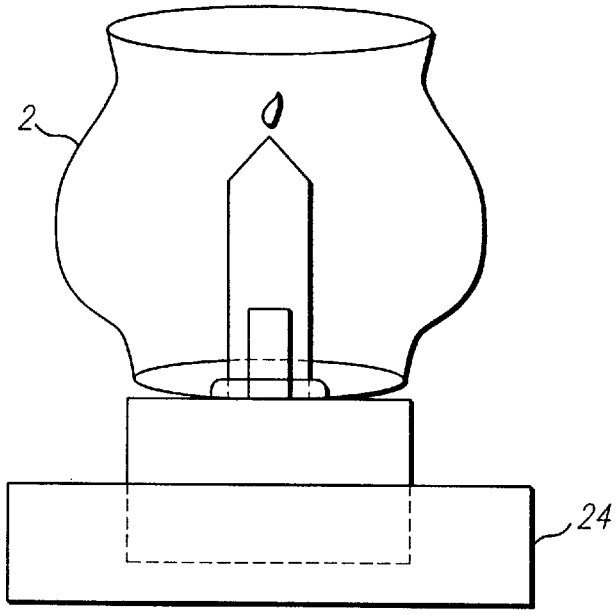
FIG. 7

COMBINED FLORAL DISPLAY AND KEEPSAKE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a combined floral display and keepsake, and more particularly, to such a combination in which the keepsake is elevated above the floral display and maintains its decorative and useful functions after the floral arrangement has been discarded.

2. Description of Prior Art

Floral and other decorative arrangements are common gifts for a variety of occasions. It is popular among florists to sell floral arrangements along with keepsakes or decorative objects, such as candles, lamps, or statuettes, that continue to be useful and meaningful to the recipient of the gift after the floral arrangement is no longer fresh and has been discarded.

In the prior art, there are three general types of devices available for such purposes:

(1) Florists have clipped or tied keepsakes to the sides of floral arrangements. Although these devices are simple, they are difficult to transport, store, and deliver. In addition, it is often difficult to attach a keepsake, such as a hurricane lamp, to a floral arrangement without a more complicated attachment mechanism.

(2) Keepsakes and floral arrangements have been combined where the keepsakes are positioned in a foam block along with the flowers. These arrangements are easier to transport than devices that simply attach the keepsakes to the sides of the arrangements. Placing the keepsake into the foam, however, limits both the flexibility of the keepsake and the floral bouquet. The bottom of the keepsake must be made so that it can be inserted into the foam. The keepsake must also be relatively tall to extend above the bouquet. Conversely, the floral arrangements must be relatively small so that the keepsake can be seen above the flowers.

(3) Keepsakes and floral arrangements have also been combined such that the floral arrangements are actually incorporated as part of the keepsakes. In these instances, the keepsakes are not independent from the floral arrangements but rather are integrated into the floral arrangements. If real flowers are used in these floral displays, the displays must be designed so that after the floral arrangements are discarded, the display still has aesthetic appeal. This requires a complicated and more expensive design than if the floral display is simply discarded along with the flowers. Other designs of this type are specifically for artificial flowers. Typical of this design is U.S. Pat. No. 3,574,498, which describes a combined multi-purpose candle holder and flower arrangement. This design, which is for artificial flowers, has no means for keeping the flowers fresh. Moreover, since artificial flowers are never "fresh," the design does not deal with discarding the floral arrangement and hence is not intended or suitable for use independent of the floral arrangement.

The combined flower display and keepsakes in the prior art tend to be either simple but limited in scope, difficult to pack, store and transport, or complicated and for artificial floral arrangements. It should therefore be appreciated that there is a need for a floral configuration that:

(a) displays real flowers along with a keepsake that, after the floral arrangement is discarded remains useful and decorative;

(b) is flexible, allowing for a variety of sized bouquets and keepsakes; and (c) is easy to store, transport and deliver to the recipient.

SUMMARY OF THE INVENTION

A principal object of the present invention is to provide an improved combined floral display and keepsake of simple and practical construction that is economical to manufacture and easy to assemble, disassemble, store, package and transport.

This invention accordingly provides a simple means for displaying flowers around the central axis of a floral container. Flowers can be positioned in a floral foam block located in the cavity portion of the floral container. A pick extends upward along the central axis of the container through the cavity portion, and the keepsake is secured above the container on the upper end of the pick. When the floral arrangement is discarded, the keepsake may be detached from the top of the pick and used independently, since it maintains its utility and aesthetic appeal after the floral arrangement is discarded.

BRIEF DESCRIPTION OF THE DRAWINGS

FIG. 2 is a perspective view of the floral container.

FIG. 3 is a perspective view of the combined floral display and keepsake with the floral arrangement in place.

FIGS. 6 and 7 are side views of a modified version of the combined floral arrangement and keepsake where the invention includes a base that attaches to the bottom of the container when the container is present, and to the bottom of the keepsake when the container is discarded.

DETAILED DESCRIPTION OF THE INVENTION

Figure 1:
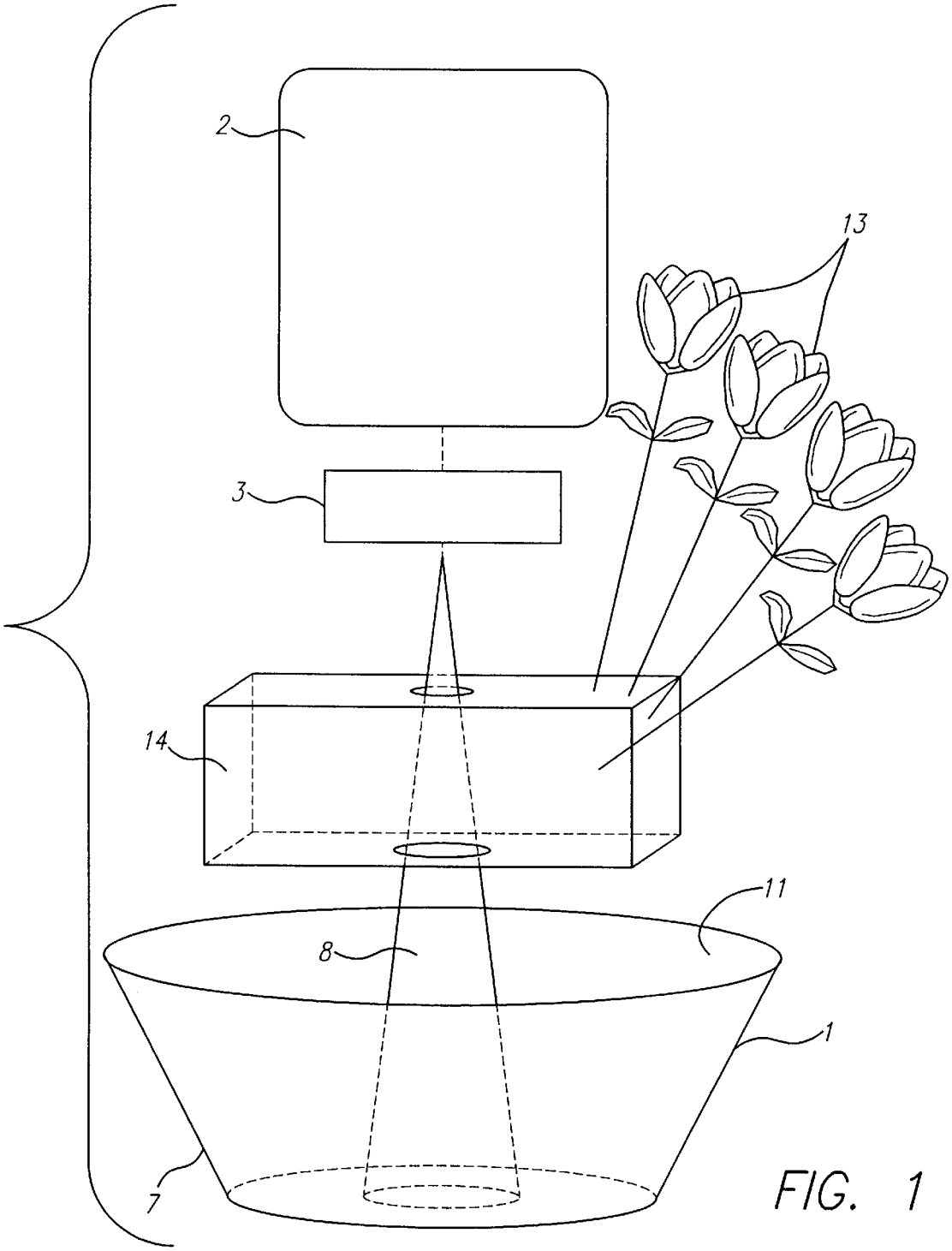
FIG. 1 is an exploded perspective view of a combined flower display and keepsake in accordance with one preferred embodiment of the invention.

A typical embodiment of the invention is illustrated in FIG. 1. The combined floral display and keepsake includes a container 1, keepsake 2, and attachment mechanism 3.

FIG. 2 shows a detailed perspective view of the container. The container has a bottom 4 with top and bottom surfaces, 5 and 6. A container wall 7 is joined with the container bottom 4 to create a cavity 11 above the container bottom. A pick 8 extends vertically upward from the top surface 5 of the container bottom 4 along the central axis of the container. A pick is generally mandrel shaped with a tapered top end. The base 10 of the pick is preferably integral with the top surface 5 of the container bottom. The container bottom, container wall, and pick can be made of disposable plastic.

As shown in FIG. 1, a floral foam block 14 can be inserted over the pick 8 into the container cavity 11. Once the foam block is in place, a floral arrangement can be created around the central axis of the container by inserting the stems of the flowers 13 into the floral foam block 14. As shown in FIG. 3, the floral arrangement can be distributed around the central axis of the container. Water can be introduced into the foam block to keep the flowers fresh.

An attachment mechanism 3 connects the top portion of the pick 9 to the bottom portion of the keepsake 2, thereby elevating the keepsake above the floral arrangement.

When the floral arrangement is no longer fresh, the floral arrangement may be discarded. The floral foam block 14 may be removed from the container cavity and may either be kept and re-used or discarded along with the floral arrangement. The container 1 and the pick 8 may also be reused or discarded The keepsake 2 remains as an independent decorative and useful unit.

Figure 4:
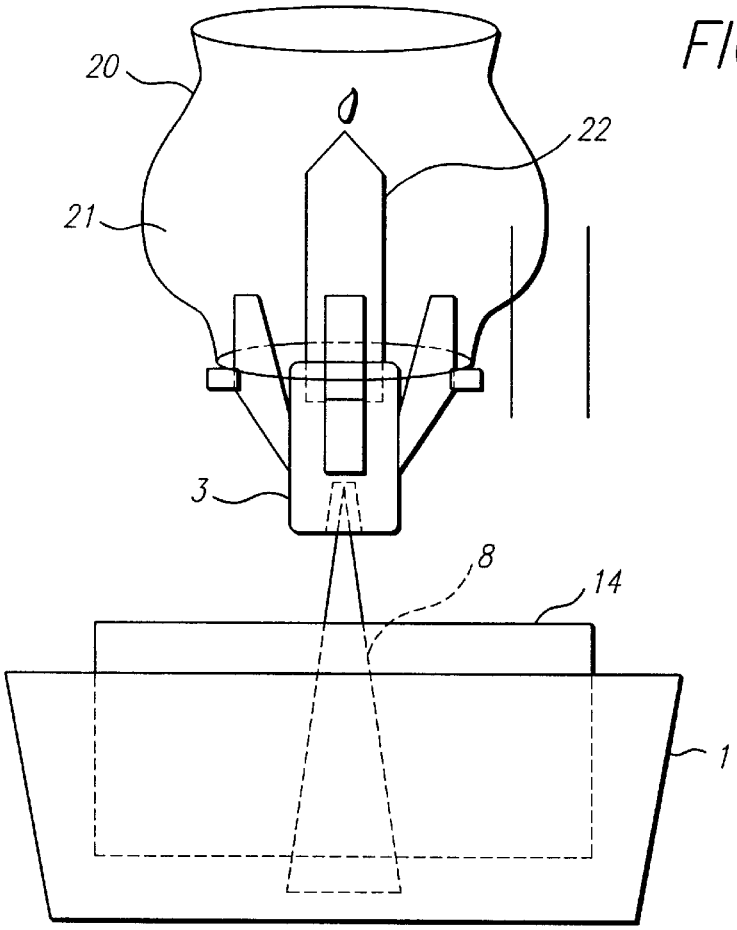
FIG. 4 is a side view of a modified version of the invention where the keepsake is a hurricane lamp.

There are various alternatives for the keepsake. For example, the keepsake may be a hurricane lamp 20 as shown in FIG. 4. This lamp consists of a globe 21 and a candle 22 positioned within the globe. The lamp 20 is elevated above the container 1 and connected to the top of the pick 8 by an attachment mechanism 3. There are numerous other types of keepsakes that can be attached to the top of the pick 8. For example, the keepsake can be another type of illuminating devise or a statuette.

Figure 5:
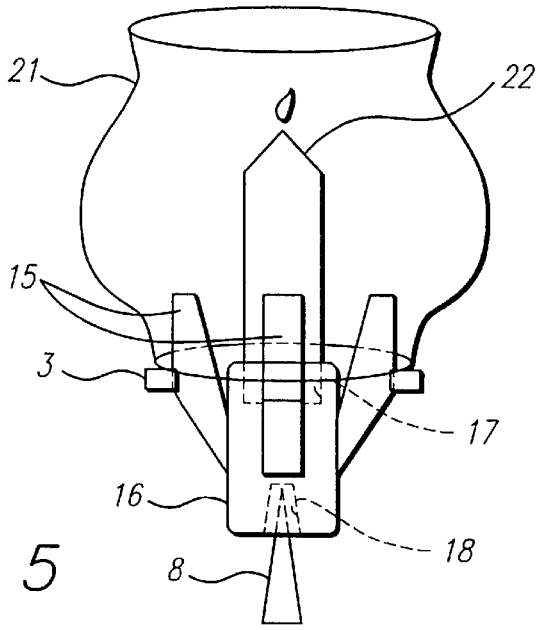
FIG. 5 is a side view of an attachment that elevates a hurricane lamp above the floral container.

There are various alternatives for the attachment mechanism 3. As shown in FIG. 5, for the embodiment with a hurricane lamp as the keepsake, the attachment mechanism is a clip 19. The clip consists of a coupler 16 extending vertically along the central axis of the container and *at least one generally vertical support connected to the coupler, for example,* multiple prongs 15 attached to the sides of coupler 16. The clip 19 is positioned on the top of pick 8. The lower end of the coupler contains a hollow portion 18. The top end of the pick 8 is secured within the hollow portion of the coupler. The top end of the coupler also contains a hollow portion 17. The candle 22, positioned within the globe 21, is secured within this hollow portion of the coupler 17. The prongs 15, attached to the sides of the clip, secure globe 21 in position, elevated above the container 1.

In another embodiment, shown in FIGS. 6 and 7, a base 24 can be incorporated as part of the combined floral arrangement and keepsake. In the embodiment shown in FIG. 1, the container 1 rests directly on a table or other surface. In the embodiment illustrated in FIGS. 6 and 7, however, the container 1 is placed on a base 24 that rests on a table or other surface. The top of the base 24 can be secured to the container bottom 4 when the floral arrangement is fresh and being used. When the floral arrangement is no longer fresh, the base 24 can be either disposable and discarded or attached to the bottom of the keepsake 2 and used as the base of the keepsake as illustrated in FIG. 7.

The combined keepsake and floral arrangement thus described has a number of significant advantages:

(1) The invention is simple, easy to assemble, and easy to disassemble when the floral arrangement is discarded.

(2) The invention is inexpensive to manufacture.

(3) Various types of keepsakes can be attached to the top of the pick and thereafter used when the floral arrangement is discarded. The present invention provides greater flexibility for florists since various keepsakes can be used with the various sized floral arrangements.

(4) The design allows the owner to keep a decorative, aesthetic and useful portion of the arrangement even after the floral arrangement is no longer fresh and must be discarded.

(5) The container is inexpensive, but sturdy and safe.

(6) The container may be disposable.

While the invention has been described in detail with reference to certain preferred embodiments, the principles involved are applicable to other embodiments as will be apparent to those skilled in the art. As illustrated above, various modifications can be effectuated within the spirit and scope of the invention. For example, the keepsake can take various forms, including hurricane lamps, other illuminating devices, or statuettes.

In addition, the invention may or may not have a base. If the invention includes a base, when the container is discarded the base can be directly attached to the bottom of the keepsake and become the base of the keepsake.

The container can also be made in various shapes. In the preferred embodiment shown, the base of the container is circular, and the container walls form a tapered cylinder to correspond to the base. In alternative embodiments, the base of the container can be other shapes, for example, square, and the container wails would correspondingly form a square shape.

Therefore, the scope of the invention should be determined by the following claims and their legal equivalents, rather than by the examples given.

I claim:

1. A multipurpose combined keepsake and floral display comprising:

a. a container having a bottom and a container wall extending upwardly from the bottom, creating a cavity above the bottom, capable of having a floral arrangement displayed therein, b. a pick with a top end and a base positioned within said container, with the base attached to the container bottom, c. a keepsake with a bottom portion and a top portion, and d. means for attaching the top end of said pick to the bottom portion of the keepsake, thus elevating the keepsake above the container, where said attachment means is a clip secured onto the top end of said pick; said clip having a coupler extending vertically along a central axis of the container with a top end and a bottom end, the bottom end having a hollow [point] *portion* into which the top end of the pick can be inserted and secured, and a plurality of prongs connected to a side of the coupler distributed around the coupler to support the keepsake above the coupler.

2. The combined keepsake and flower display of claim 1 wherein a foam block is inserted onto the pick and positioned above the container bottom as a means for creating the floral arrangement.

3. The combined keepsake and flower display of claim 1 wherein the keepsake is a hurricane lamp including a globe and a candle positioned within the globe.

4. The combined keepsake and floral display of claim 1 wherein said container bottom has a top surface and a bottom surface and a base is attached to the bottom surface of the container bottom that can also be attached to the bottom portion of the keepsake.

5. A multipurpose combined keepsake and floral display comprising:

a. a container having a circular bottom and a tapered cylindrical wall extending upwardly from the bottom with a smaller edge attached to the bottom, creating a cavity above the bottom capable of having a floral arrangement displayed therein, b. a mandrel-shaped pick with a tapered top end and a base positioned within said container, with the base attached to the container bottom, c. a keepsake with a bottom portion and a top portion, and d. means for attaching the top end of said container pick to the bottom portion of the keepsake, thus elevating the keepsake above the container, where said attachment means is a clip secured onto the top end of said pick; said clip having a coupler extending vertically along a central axis of the container with a top end and a bottom end, the bottom end having a hollow [point] *portion* into which the top end of the pick can be inserted and secured, and a plurality of prongs connected to a side of the coupler distributed around the coupler to support the keepsake above the coupler.

6. The combined keepsake and flower display of claim 5 wherein a foam block is inserted onto the pick and positioned above the container bottom as a means for creating the floral arrangement.

7. The combined keepsake and flower display of claim 5 wherein the keepsake is a hurricane lamp including a globe and a candle positioned within the globe.

8. The combined keepsake and floral display of claim 5 wherein said container bottom has a top surface and a bottom surface and a base is attached to the bottom surface of the container bottom that can also be attached to the bottom portion of the keepsake.

9. A multipurpose combined keepsake and floral display comprising:

a. a container having a bottom, said bottom having a bottom surface and a top surface, and a container wall extending upwardly from the bottom, creating a cavity above the bottom capable of having a floral arrangement displayed therein, b. a pick with a top end and a base positioned within said container, with the pick base attached to the container bottom, c. a keepsake with a bottom portion and a top portion, d. means for attaching the top end of said pick to the bottom portion of the keepsake, thus elevating the keepsake above the container, and e. a base attached to said bottom surface or the container bottom and further including a means for attaching said base to the bottom portion of said keepsake when said container bottom is removed, and wherein said keepsake is a hurricane lamp including a globe and a candle positioned with the globe.

10. The combined keepsake and floral display of claim 9 wherein said means for attaching the pick to the keepsake is a clip secured onto the top end of said pick; said clip having a coupler extending vertically along a central axis of the container with a top end and a bottom end, the bottom end having a hollow [point] *portion* into which the top end of the pick can be inserted and secured, and a plurality of prongs connected to a side of the coupler distributed around the coupler to support the keepsake above the coupler.

*11. A multipurpose combined keepsake and floral display comprising:*

*a. a container having a bottom and a container wall, the container wall extending upwardly from the bottom, creating a cavity above the bottom, capable of having a floral arrangement displayed therein;*

*b. a pick with a top end and a base positioned within said container, with the base attached to the container bottom;*

*c. a keepsake with a bottom portion and a top portion; and*

*d. a clip including a coupler releasably engaged with the top end of the pick, the keepsake positioned upon and supported by the coupler and extending above the container wall, the clip further including a plurality of generally vertical supports connected to the coupler, the vertical supports in releasable engagement with the keepsake and holding the keepsake firmly in position on the coupler.*

*12. The multipurpose combined keepsake and floral display of claim 11, wherein the coupler has a top end, a lower end, and a plurality of sides, the lower end and the pick having interengaging regions which releasably connect them together, the top end of the coupler being abutted by the bottom portion of the keepsake, the vertical supports being distributed about the periphery of the top end of the coupler to engage the keepsake such that the keepsake is held firmly on the top end of the coupler against lateral displacement in all directions.*

*13. The multipurpose combined keepsake and floral display of claim 11 further comprising a body of stem supporting material positioned within the cavity and held in position by the pick.*

*14. A multipurpose combined keepsake and floral display comprising:*

*a. a container having a bottom and a container wall, the container wall extending upwardly from the bottom, creating a cavity above the bottom, capable of having a floral arrangement displayed therein;*

*b. a pick with a top end and a base positioned within said container, with the base attached to the container bottom;*

*c. a keepsake with a bottom portion and a top portion; and*

*d. an attachment mechanism configured to detachably affix to the top end of the pick and to secure the keepsake in a position elevated above the container.*

*15. The combined keepsake and floral display of claim 14, wherein the attachment mechanism includes:*

*a clip configured to secure the top end of the pick to the coupler;*

*at least one generally vertical support attached to the coupler and configured to secure the bottom portion of the keepsake to the coupler.*

* * * * *

UNITED STATES PATENT AND TRADEMARK OFFICE

CERTIFICATE OF CORRECTION

PATENT NO. : Re. 36,438

DATED : December 14, 1999

INVENTOR(S) : Honkawa, Bryan K.

It is certified that error appears in the above-identified patent and that said Letters Patent is hereby corrected as shown below:

In claim 15, line 3, delete "clip" and insert --coupler--.

Signed and Sealed this

Eighteenth Day of July, 2000

*Attest:*

Q. TODD DICKINSON

*Attesting Officer*

*Director of Patents and Trademarks*

Disclaimer and Dedication

Re.36,438—Bryan K. Honkawa, Malibu, Calif. COMBINED FLORAL DISPLAY AND KEEPSAKE. Patent dated December 14, 1999. Disclaimer and Dedication filed November 10, 2000, by the assignee, Teleflora LLC.

Hereby disclaims and dedicates to the Public all claims and entire term of said patent.

*(Official Gazette, March 6, 2001)*